US007862181B2

United States Patent
Lin et al.

(10) Patent No.: US 7,862,181 B2
(45) Date of Patent: Jan. 4, 2011

(54) PROJECTION APPARATUS

(75) Inventors: Chia-Jui Lin, Taoyuan County (TW); Hsiu-Ming Chang, Taoyuan County (TW); Kuo-Ching Chang, Taoyuan County (TW); Hui-Chih Lin, Taoyuan County (TW); Yu-Ho Tsao, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 698 days.

(21) Appl. No.: 11/734,922

(22) Filed: Apr. 13, 2007

(65) Prior Publication Data
US 2007/0247592 A1  Oct. 25, 2007

Related U.S. Application Data

(63) Continuation-in-part of application No. 11/531,520, filed on Sep. 13, 2006, now abandoned.

(30) Foreign Application Priority Data

Apr. 13, 2006  (TW)  ............................... 95113158 A
Apr. 12, 2007  (TW)  ............................... 96112883 A

(51) Int. Cl.
  G03B 21/26   (2006.01)
  F25B 21/02   (2006.01)
  F25D 23/12   (2006.01)
(52) U.S. Cl. ............................. 353/54; 62/3.3; 62/3.7; 62/259.1

(58) Field of Classification Search .................. 353/52, 353/54; 62/3.2, 3.3, 3.7, 259.2, 264; 362/373, 362/800
See application file for complete search history.

(56) References Cited

U.S. PATENT DOCUMENTS

| 6,991,335 | B2 | 1/2006 | Kondo et al. | |
| 7,309,145 | B2 * | 12/2007 | Nagata et al. | ............... 362/294 |
| 2002/0136523 | A1 | 9/2002 | Brown et al. | |
| 2003/0188538 | A1 | 10/2003 | Chu et al. | |
| 2004/0257491 | A1 | 12/2004 | Kitabayashi | |
| 2005/0168990 | A1 * | 8/2005 | Nagata et al. | ............... 362/294 |
| 2006/0082732 | A1 | 4/2006 | Miwa et al. | |
| 2007/0103646 | A1 * | 5/2007 | Young | ........................ 353/52 |
| 2007/0240429 | A1 | 10/2007 | Lin | |
| 2007/0247592 | A1 * | 10/2007 | Lin et al. | ...................... 353/54 |

* cited by examiner

*Primary Examiner*—John R Lee
(74) *Attorney, Agent, or Firm*—Patterson Thuente Christensen Pedersen, P.A.

(57) ABSTRACT

A projection apparatus having a temperature controlling system is provided. The projection apparatus comprises at least a heat generating element, while the temperature controlling system comprises a liquid flow system, a heat generating device, and a heat transferring device. The liquid flow system is disposed along the heat generating element. The heat generating device produces heat with a positive value (endothermic) or a negative value (exothermic) in response to an environment dependent on the location of the projection apparatus. The heat transferring device transfers the heat generated by the heat generating device along the liquid flow system. The present invention maintains the operation of the projection apparatus under the desired working temperature and enables a thermal equilibrium of the projection apparatus without being influenced by the over-temperature or under-temperature of the external environment.

21 Claims, 9 Drawing Sheets

PROJECTION APPARATUS

CROSS-REFERENCES TO RELATED APPLICATIONS

This application is a continuation-in-part of U.S. patent application Ser. No. 11/531,520, filed on Sep. 13, 2006.

This application benefits from the priorities of Taiwan Patent Application No. 095113158 filed on Apr. 13, 2006 and Taiwan Patent Application No. 096112883 filed on Apr. 12, 2007, the disclosures of the latter of which are incorporated herein by reference in their entirety.

BACKGROUND OF THE INVENTION

1. Field of the Invention

The present invention relates to a projection apparatus having a temperature controlling system. More particularly, the present invention relates to a technology for generating or radiating heat in response to different ambient temperatures to maintain the operation of a projection apparatus under the desired working temperature.

2. Descriptions of the Related Art

In designing most projection systems, a cooling system is important in maintaining the operation of interior elements under a certain temperature and extending service life of the interior elements, especially for large scale, heavy duty, or high heat producing projection systems. More specifically, the interior elements can be categorized into a lower temperature group and a higher temperature group when the projection system operates. A proper design allows the cooling liquid to first flow through the low temperature group of elements and then through the high temperature group of elements, thereby reducing the temperature of the projection system and maintaining the system at operation under a mean temperature. Thus, to maximize cooling efficiency, the cooling system needs to be adjusted and improved according to the inner optical arrangement of the projection system.

Liquid cooling and air cooling are the two common ways for cooling projection systems. Either method of liquid or air cooling adopts the circulation of fluid to reduce the interior temperature of the projection system. However, the liquid cooling method is more effective in equalizing temperature of interior components and generating less noise. At the same time, the liquid cooling method requires more space and is usually applied to a projection system that is operated in a larger place, such as a public place, mass transition station, or an airport. It is understandable that, in general, the characteristics of the air cooling method are just as adverse as those of the liquid cooling method. As a result, a common cooling medium used for liquid cooling is water because of its high specific heat and capability of absorbing a large amount of heat without obvious temperature fluctuations. In conjunction with the use of a fin and/or a fan to expand the heat dissipation area, the efficiency of heat dissipation of liquid cooling can also be improved.

Limited by the working temperature of the interior components, the present projection system could only operate between 5° C. to 35° C. to ensure stability at normal operation and fulfill the expected service life of the projection system. When the ambient temperature ascends above the upper temperature limit, the cooling capability of the projection system requires reinforcement to prevent internal components from continuously generating heat with a positive value, thereby reducing the efficiency and service life of the apparatus. On the contrary, when the ambient temperature descends below the lower temperature limit, the projection system requires heat to raise the temperature of the internal components to a working temperature so that the projection system may operate normally.

There are many improved liquid or air cooling technologies for projection systems in the market. Even so, there is neither a competitive technology for raising the temperature of the system from a very low ambient temperature to a normal working temperature, nor a technology that efficiently cools the system at a very high ambient temperature and heats the system at a very low ambient temperature.

Therefore, the research and development of a liquid cooling technology for use in adjusting the interior temperature of the projection apparatus is needed. In other words, an advanced temperature controlling system is required in the market. The system should be able to: (1) raise the temperature of the components from an extremely low ambient temperature to a working temperature to start up the system, (2) reduce the temperature of the components to function under high ambient temperatures (3) stop the cooling process when the temperature is normal, (4) reduce the generation of noise and (5) consume less power.

SUMMARY OF THE INVENTION

The primary object of this invention is to provide a temperature controlling system adapted for a projection apparatus. The projection apparatus comprises at least one heat generating element. The temperature controlling system comprises a liquid flow system, a heat generating device, and a heat transferring device. The liquid flow system is disposed along the heat generating element. The heat generating device selectively generates heat with a positive value when the temperature is lower than the ambient temperature. Likewise, the heat generating device selectively generates heat with a negative value when the temperature is higher than the ambient temperature. The heat transferring device transfers the heat generated by the heat generating device along the liquid flow system, thereby maintaining the operation of the projection apparatus under the desired working temperature.

Another object of this invention is to provide a temperature controlling system adapted for a projection apparatus. The projection apparatus comprises at least one heat generating element. The temperature controlling system comprises a liquid flow system, a heat generating device, and a heat transferring device. The liquid flow system is disposed along the heat generating element. The heat generating device generates heat with a positive value in response to a temperature lower than the ambient temperature. The heat transferring device transfers the heat generated by the heat generating device along the liquid flow system, thereby maintaining the operation of the projection apparatus under the desired working temperature.

Yet a further object of this invention is to provide a projection apparatus. The projection apparatus comprises the temperature controlling system as mentioned above. With the temperature controlling system, the projection apparatus radiates heat that is generated during the operation of the projection apparatus, thus, protecting the apparatus from overheating. Furthermore, the temperature controlling system assists the interior of the projection apparatus, which is located in a below-temperature environment, in warming up to the desired working temperature.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
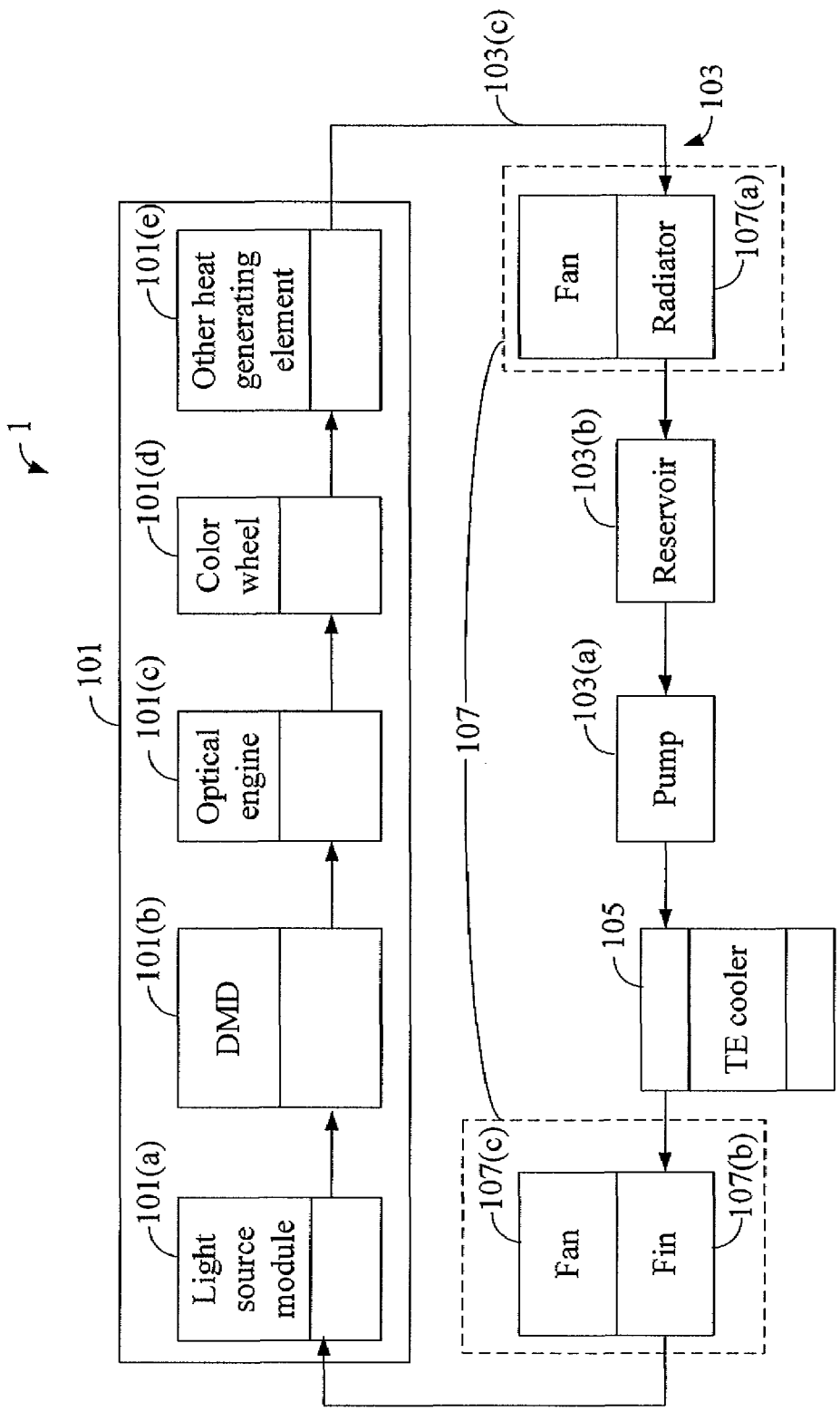
FIG. 1 is a schematic flow diagram of a projection apparatus adopting the temperature controlling system in accordance with the present invention.

With reference to FIG. 1, the temperature controlling system is adapted for a projection apparatus 1, which comprises a plurality of heat generating elements 101. The temperature controlling system of the present invention is able to regulate the circumferential temperature of the heat generating elements 101. As a result, the projection apparatus is able to operate under an anticipated and proper working temperature. It is understandable that the heat generating elements 101 may comprise a light source module 101(a), a digital micromirror device (DMD) 101(b), an optical engine 101(c), a color wheel 101(d), and/or other elements 101(e) that may generate heat. The heat generating element elements 101 are disposed at appropriate positions to fit the needs of temperature distribution. Furthermore, the heat generating elements 101 may not comprise the color wheel 101(d) under the circumstance that the light source module 101(a) is a light emitting diode (LED) module.

The temperature controlling system comprises a liquid flow system 103, a heat generating device, and a heat transferring device. The liquid flow system 103 is preferably a closed system which comprises at least a pump 103(a), a reservoir 103(b), and a liquid pipe 103(c). The liquid flow system 103 is disposed along the heat generating elements 101. The liquid flow system 103 and the heat generating elements 101 are substantially connected to each other. Heat generated by the heat generating elements 101 is transferred through the liquid pipe 103(c) by a circulating liquid that has high specific heat to control the temperature. The circulating liquid is preferably but not limited to, water. After the temperature of the circulating liquid gradually reaches equilibrium, the circulating liquid flows into the reservoir 103(b). Thereafter, the circulating liquid in the reservoir 103(b) is pressurized by a pump 103(a), and pushed to flow towards the heat generating elements 101 along the liquid pipe 103(c). A further cycle subsequently starts to control the temperature of the interior of the projection apparatus.

The following descriptions are provided for further illustrating the features of the present invention. The heat generating device, disposed behind the pump 103(a), selectively generates heat with a positive value or a negative value in response to a temperature lower than or a temperature higher than the ambient temperature, respectively. In this embodiment, the heat generating device 105 can be a thermoelectric device (TE device). The TE device can be either a TE heater or a TE cooler for generating heat with a positive value or a negative value, respectively. The heat generating device can also be a traditional heater for generating heat with the positive value. The heat generating device changes the initial temperature of the circulating liquid to heat up or cool down the circulating liquid to the desired working temperature.

The heat transferring device 107 then transfers the heat selectively generated by the heat generating device 105 along the liquid flow system 103, thereby maintaining the operation of the projection apparatus 1 under the desired working temperature. The heat transferring device 107 can include a radiator 107(a), at least one fin 107(b), and/or at least a fan 107(c), which follow(s) the heat generating device 105 or heat generating elements 101 for heat transfer in the liquid flow system 103.

Figure 2A:
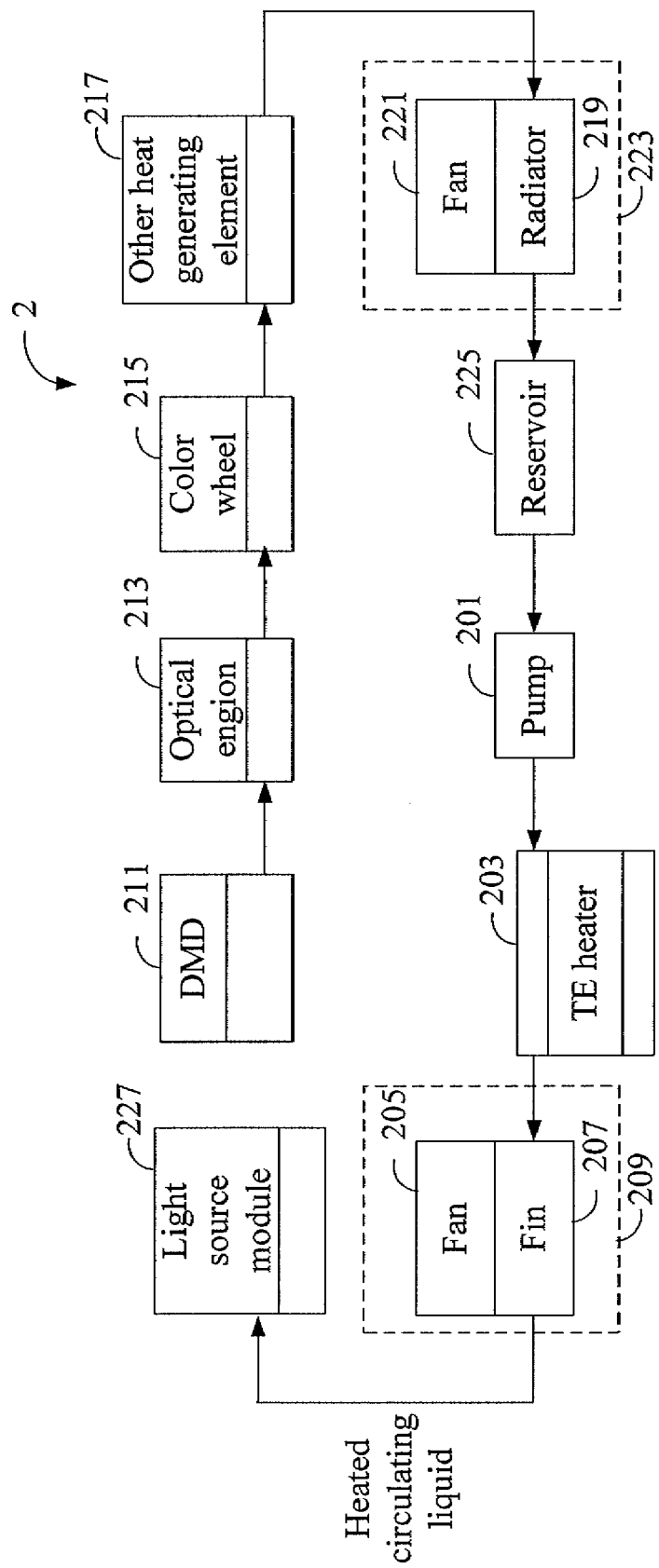
FIG. 2(a) is a schematic flow diagram of a projection apparatus adopting the temperature controlling system under a low temperature environment in accordance with the present invention.

Furthermore, when the projection apparatus needs to operate under a relatively low temperature environment, like an environment with a temperature lower than one required for the apparatus to start up at 5° C., an embodiment of the present invention, shown in FIG. 2(a), is adopted for this situation. The embodiment is a projection apparatus 2 comprising the aforementioned temperature controlling system. The heat generating device is a TE heater 203 for generating heat with a positive value in response to a temperature lower than the ambient temperature. The projection apparatus 2 is disposed under a low temperature environment, and therefore, the circulating liquid of the temperature controlling system bears a lower initial temperature. Once the circulating liquid flows out from the pump 201, the TE heater 203 raises the temperature of the circulating liquid by exerting heat with the positive value. The first heat transferring device 209, comprising a fan 205 and a fin 207, radiates heat with the positive value to other parts of the projection apparatus 2, especially to heat generating elements such as the lamp of the light source module 227, to raise the overall temperature of the projection apparatus 2. The circulating liquid, with the raised temperature, flows through the light source module 227, the DMD 211, optical engine 213, color wheel 215, and other heat generating elements 217, to raise the temperature of these elements by exerting heat with the positive value carried by the circulating liquid. The circulating liquid may further flow through a second heat transferring device 223, comprising a radiator 219 and a fan 221, to radiate the heat into the projection apparatus 2. Then, the circulating liquid flows into the reservoir 225 to complete a circulation cycle.

Figure 2B:
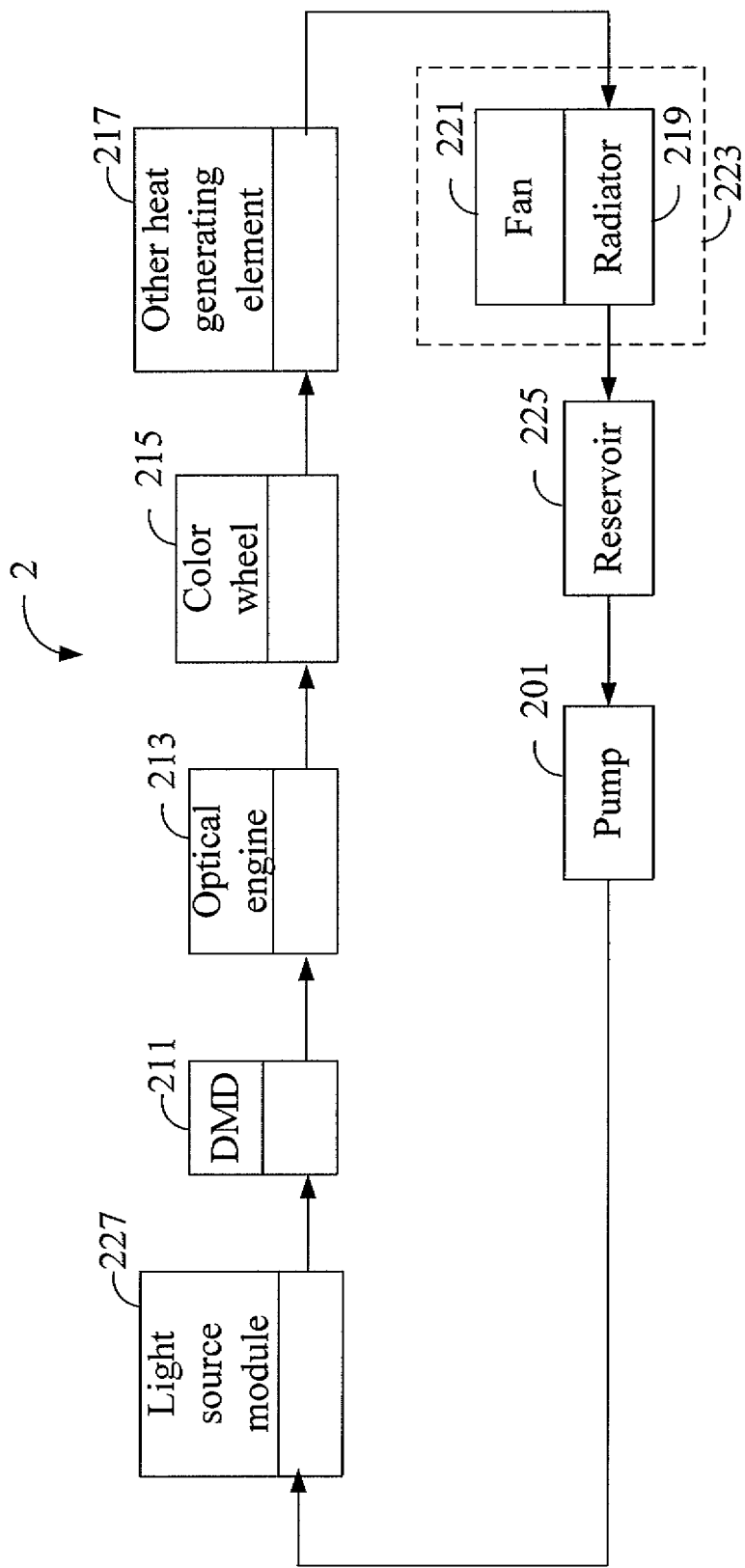
FIG. 2(b) is a schematic flow diagram of a projection apparatus adopting the temperature controlling system in accordance with the present invention, in which the system begins to operate in a low temperature environment.

The pump 201 dips out the circulating liquid from the reservoir 225, and then continues the next cycle to raise the temperature of the interior of the projection apparatus 2. When the projection apparatus 2 reaches the temperature for starting up the apparatus, as shown in FIG. 2(b), the TE heater 203 and the first heat transferring device 209 stop working. As a result, heat with the positive value is not generated anymore to help the projection apparatus 2 start up, wherein the elements (including the TE heater 203 and the first heat transferring device 209) are omitted in this figure represents to show their termination of work.

Figure 3:
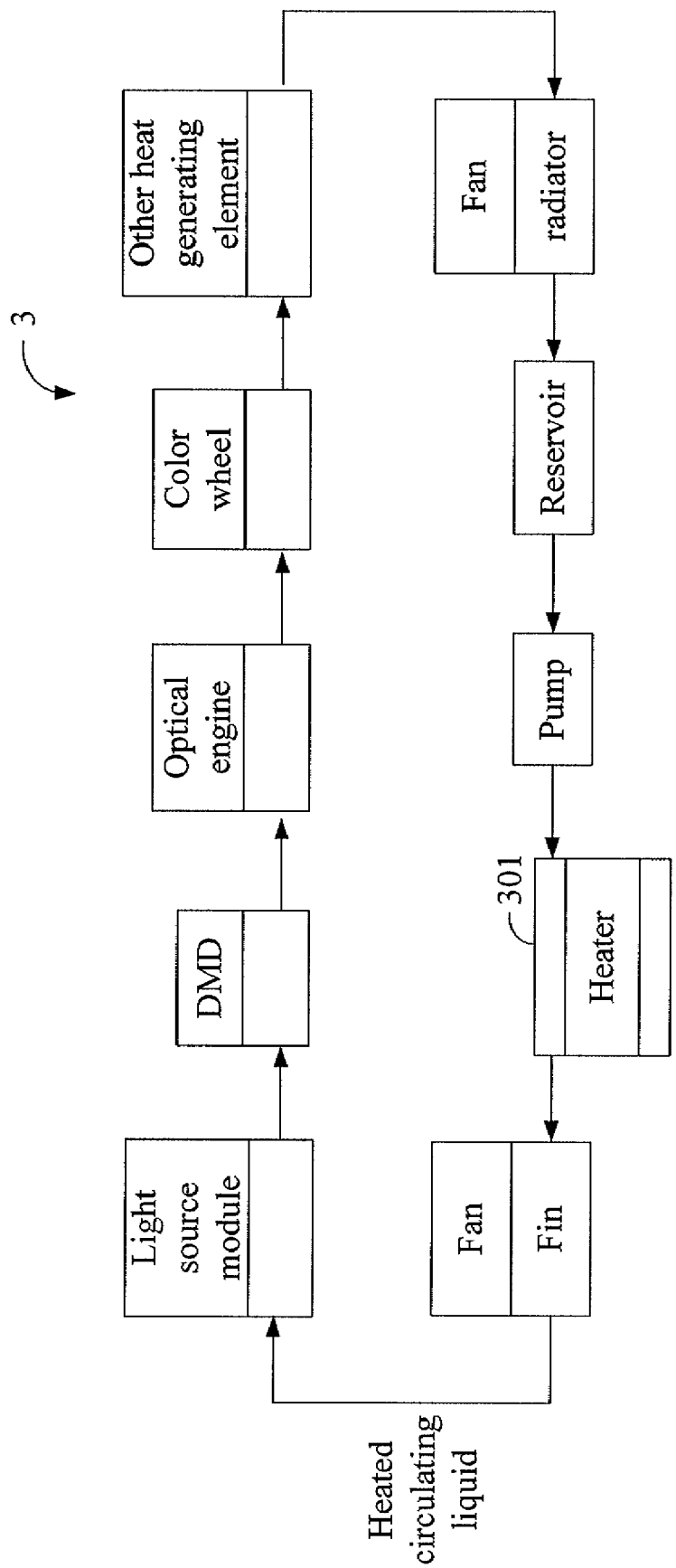
FIG. 3 is a schematic flow diagram of a projection apparatus adopting an alternative temperature controlling system in a low temperature environment in accordance with the present invention.

When the projection apparatus needs to operate under a relatively low temperature environment, which is lower than the start-up temperature of the interior elements, another embodiment of the present invention, shown in FIG. 3, is possible by replacing the TE heater with a traditional heater 301. The principle underlying the operation of this embodiment is the same as that of the aforementioned embodiment.

Figure 4:
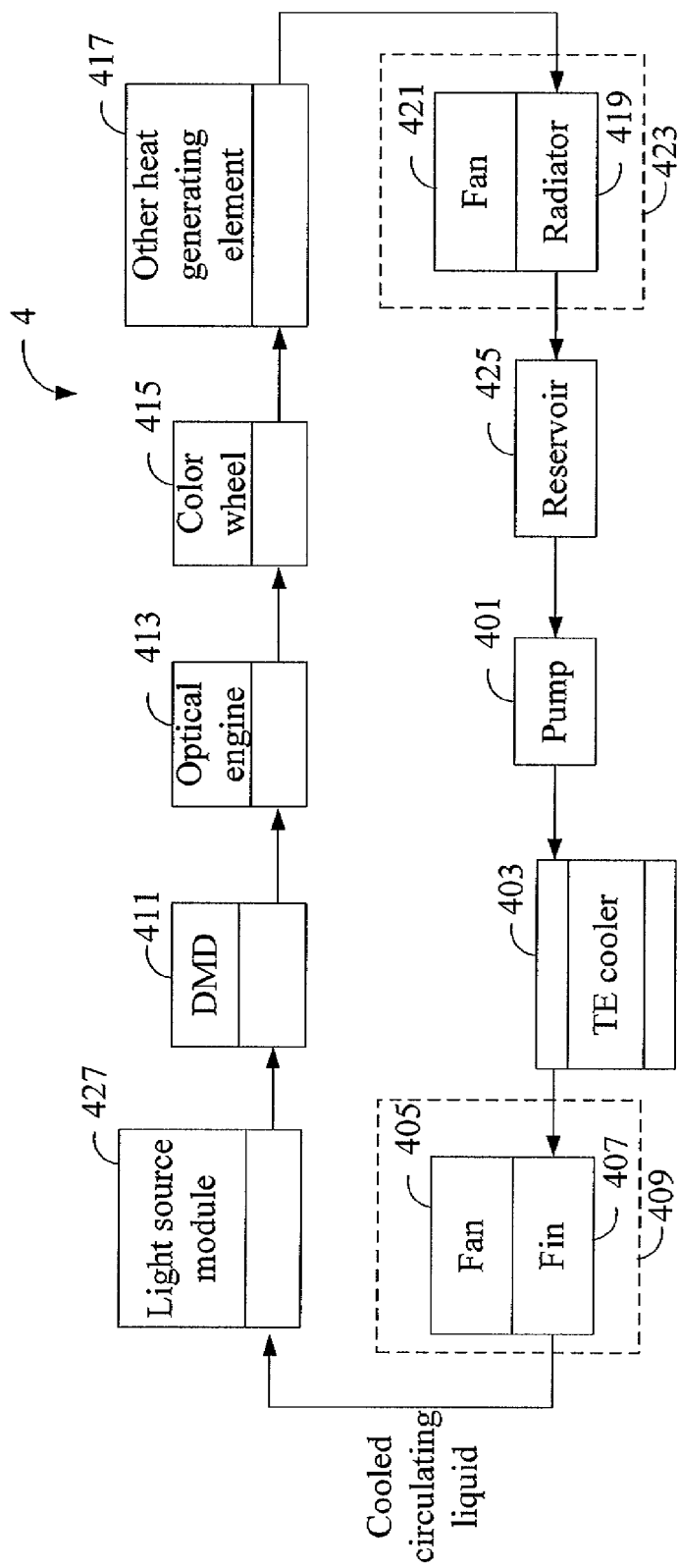
FIG. 4 is a schematic flow diagram of a projection apparatus adopting the temperature controlling system under a high temperature environment in accordance with the present invention.

If the projection apparatus needs to operate under a relatively high temperature environment, like an environment with a temperature higher than that required to start up the apparatus at 35° C., an embodiment of the present invention, shown in FIG. 4, is adapted for this situation. The embodiment is a projection apparatus 4 comprising the aforementioned temperature controlling system, while the heat generating device is a TE cooler for generating heat with a negative value in response to a temperature higher than the ambient temperature. The projection apparatus 4 is disposed in a high temperature environment, where the circulating liquid of the temperature controlling system bears a higher initial temperature. Once the circulating liquid flows out from the pump 401, the TE cooler 403 reduces the temperature of the circulating liquid by exerting heat with the negative value. The first heat transferring device 409, comprising a fan 405 and a fin 407, radiates the heat with the negative value to other parts of the projection apparatus 4 to reduce the overall temperature of the projection apparatus 4. The aforementioned heat with the negative value may be formed by ventilating air which is generated by a fan blowing over the cooled circulating liquid. The cooled down circulating liquid flows through a light source module 427, a DMD 411, an optical engine 413, a color wheel 415, and other heat generating elements 417, to reduce the temperature of these elements by exerting heat with the negative value that is carried by the circulating liquid. The circulating liquid may further flow through a second heat transferring device 423, comprising a radiator 419 and a fan 421, to radiate the heat into the projection apparatus 4. The circulating liquid then flows into the reservoir 425 to complete the circulation cycle. The pump 401 dips out the circulating liquid from the reservoir 425, and then continues the next circulation to reduce the temperature of the interior of the projection apparatus 4 again. When the projection apparatus 4 reaches the temperature for starting up the apparatus, the TE cooler 403 and the first heat transferring device 409 continue to generate heat with the negative value to help cool the projection apparatus 4 after start-up.

Figure 5:
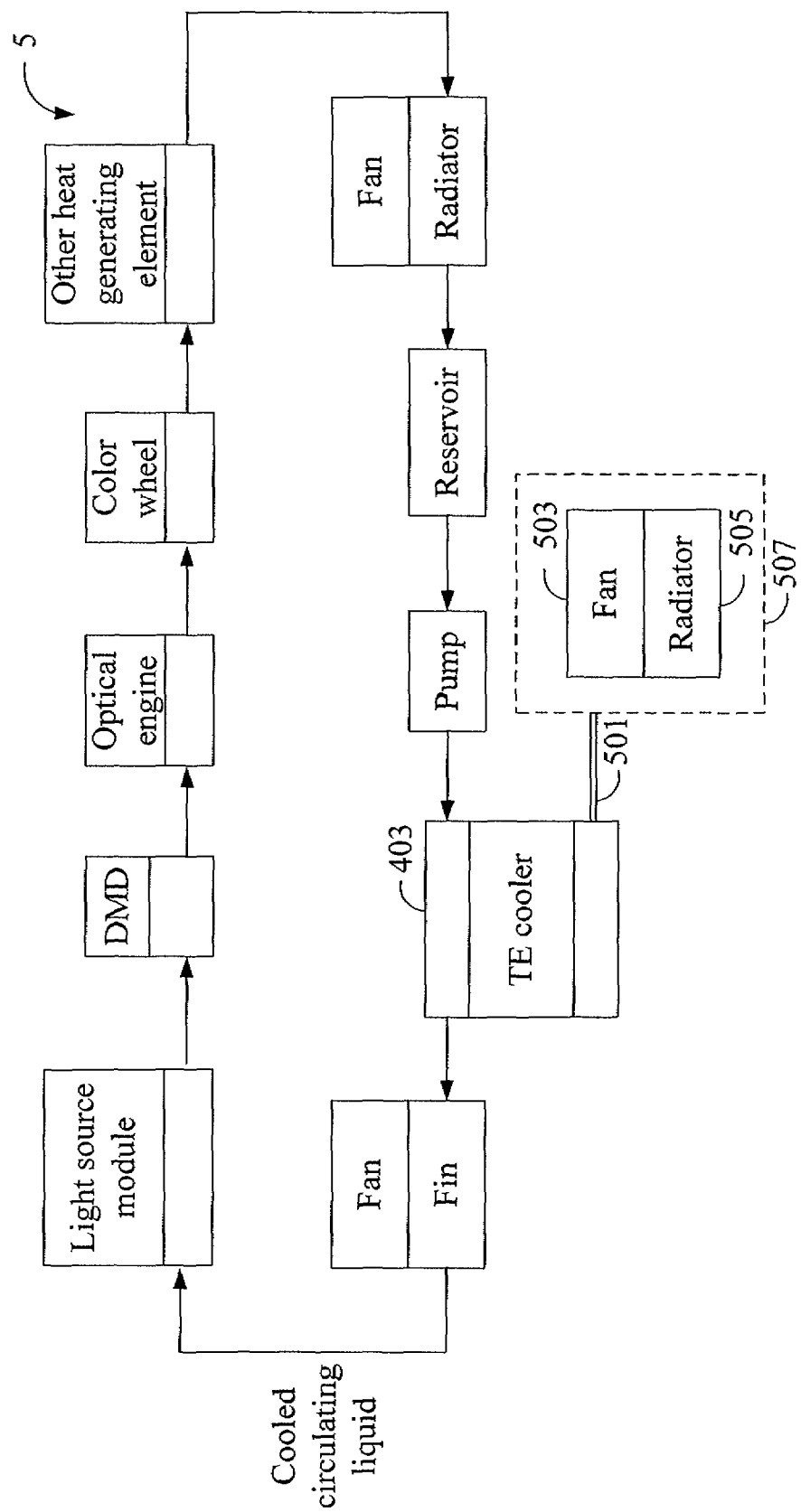
FIG. 5 is a schematic flow diagram of a projection apparatus adopting an alternative temperature controlling system under a high temperature environment in accordance with the present invention.

When the projection apparatus needs to operate in a relatively high temperature environment which is higher than the start-up temperature of the interior elements, another embodiment of the present invention, shown in FIG. 5, is implemented. The hot side of the TE cooler 403 of the former embodiment is connected, via a heat pipe 501, to the third heat transferring device 507 comprising a fan 503 and a radiator 505. The heat pipe 501 transfers the heat generated by the hot side of the TE cooler 403 to the third heat transferring device 507. The application of the fan 503 and the radiator 505 allows the heat to spread out rapidly to improve heat radiation efficiency of the projection apparatus 5. The principle underlying the operations of the other parts of this embodiment is the same as that of the aforementioned embodiments.

Figure 6A:
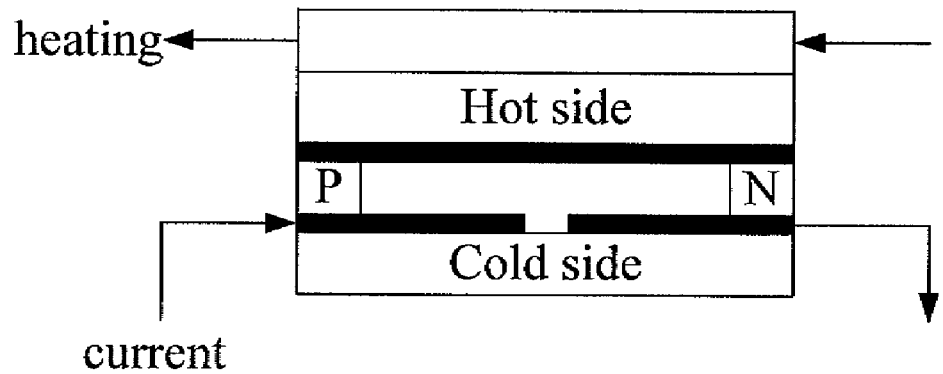
FIG. 6(a) is a schematic diagram showing the TE device under a heating mode by switching the current direction.
Figure 6B:
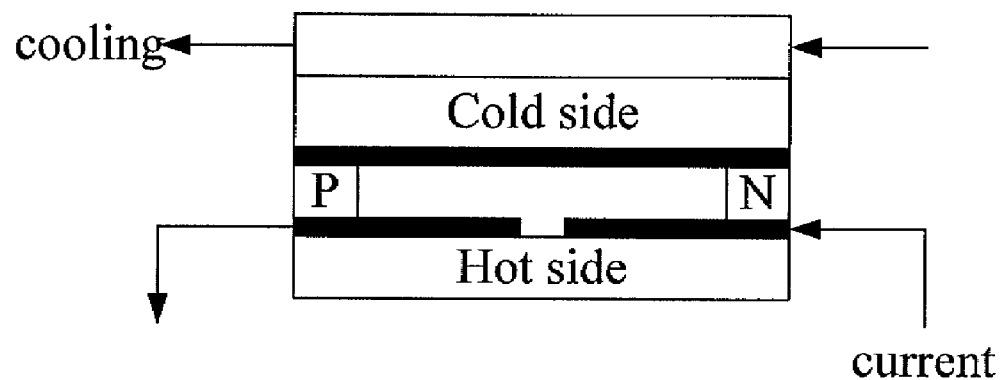
FIG. 6(b) is a schematic diagram showing the TE device under a cooling mode by switching the current direction.
Figure 7A:
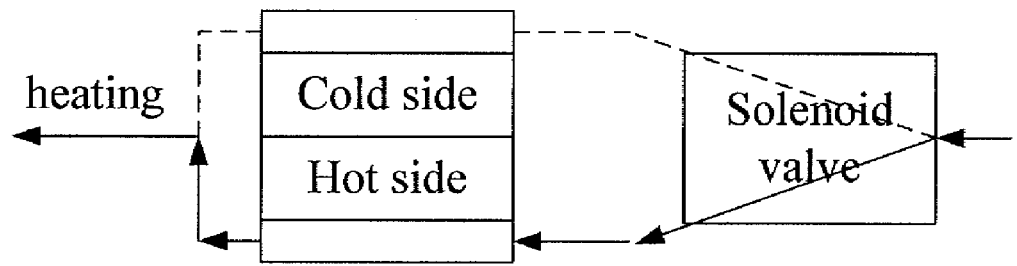
FIG. 7(a) is a schematic diagram showing the TE device under a heating mode by means of controlling a solenoid valve.
Figure 7B:
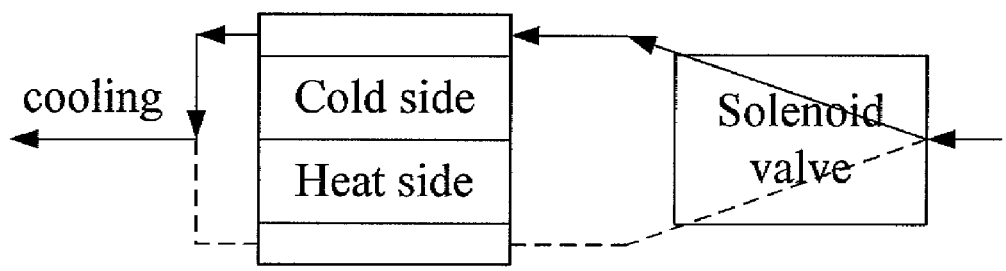
FIG. 7(b) is a schematic diagram showing the TE device under a cooling mode by means of controlling a solenoid valve.

In the above-mentioned embodiments, the TE heater and the TE cooler can be included in the TE device. By applying different current directions, as shown in FIG. 6(a) or FIG. 6(b), the TE device can be switched to a heating mode or a cooling mode in response to the desired interior working temperatures of the projector under different ambient temperatures. The technology of switching the TE device to the heating mode or a cooling mode can also be implemented by a solenoid valve to achieve a similar objective, as shown in FIG. 7(a) or FIG. 7(b). Moreover, replacing the TE device with other kinds of merchant TE coolers that have the dual function of switchable heating and cooling modes also achieves the objective of the present invention.

Figure 8A:
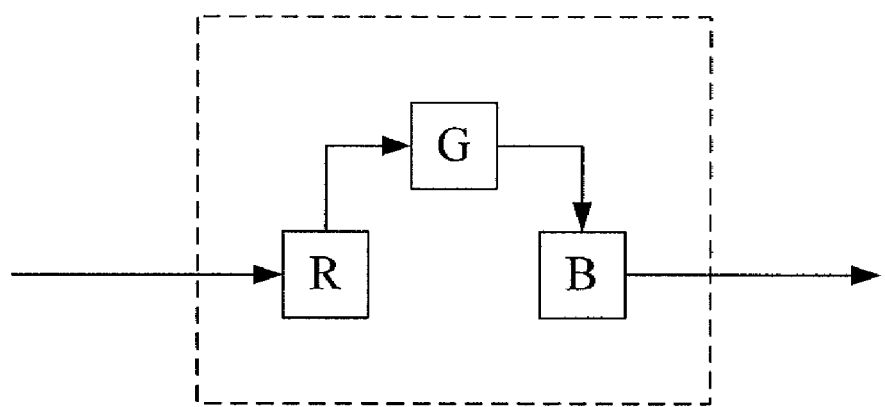
FIG. 8(a) is a schematic diagram showing an LED module of which the LEDs are disposed in series along the liquid flow system.
Figure 8B:
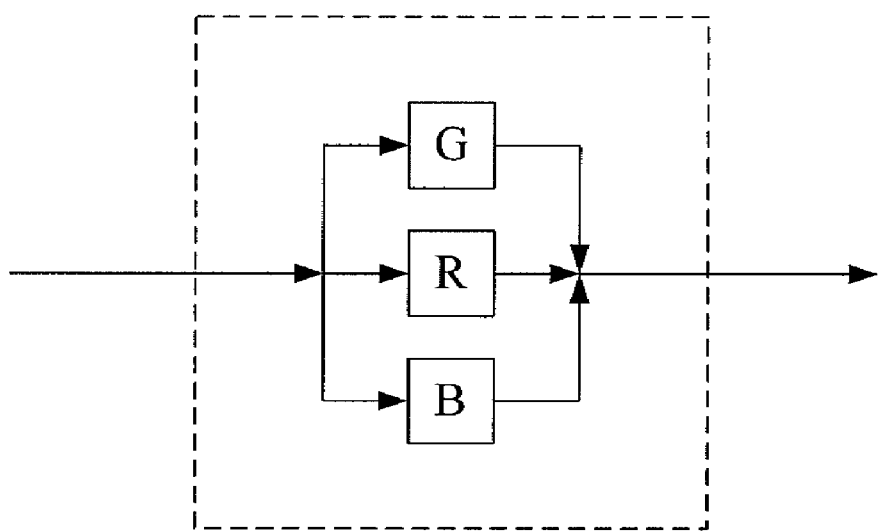
FIG. 8(b) is a schematic diagram showing an LED module of which the LEDs are disposed in parallel in view of the liquid flow system.

In the present embodiments, the light source module can be an LED module, an ultra high performance (UHP) light source module, an ultra high efficiency (UHE) light source module, or a metal halide lamp module. The LED module, for example, comprises a plurality of LEDs, which includes a red LED (R), a green LED (G), and a blue LED (B). These LEDs are members of the light source module, which is one of the heat generating elements, and the liquid flow system are disposed along the LEDs. There are two general ways to arrange the LEDs, that is, to dispose R, G. and B in series or and in parallel in view of the liquid flow system, as shown in FIG. 8(a) and FIG. 8(b), respectively. These selective ways facilitate the design for the layout of the interior of the projection apparatus according to the desired, or the heat generated by the LEDs having different powers.

Specifically, in the case that the LEDs are disposed in series, the circulating liquid in the liquid flow system is adapted to travel through or along the plurality of LEDs sequentially to dissipate the heat of the LEDs. In the case that the LEDs are disposed in parallel, the circulating liquid in the liquid flow system travels through or along the plurality of LEDs simultaneously to for their heat dissipation. It is understandable that the type of the lamp(s) adapted for the light source module is (are), but not limited to, an ellipsoid lamp, a parabolic lamp, or other type of lamps that are commonly used in this field.

The aforementioned liquid heat transferring technology of cooling and/or heating may be utilized in assisting the projection apparatus in reaching a normal start-up temperature after evaluating the abnormal ambient temperature of the projection apparatus. People skilled in this field may apply the technology on a normally operating projection apparatus for maintaining its interior working temperature under a normal condition, thereby improving the efficiency of the projection apparatus, and extending the service life of the interior elements, especially the heat generating elements.

The above disclosure is related to the detailed technical contents and inventive features thereof People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus, comprising:
   at least one heat generating element;
   a temperature controlling system, comprising:
   a liquid flow system, disposed along the at least one heat generating element;

a heat generating device for selectively generating heat with a positive value in response to a temperature of an interior of the projector apparatus being lower than a low start-up temperature, and generating heat with a negative value in response to a temperature of an interior of the projector apparatus being higher than a high start-up temperature; and a heat transferring device for transferring the heat generated by the heat generating device along the liquid flow system, thereby maintaining the temperature of the interior of the projection apparatus at operation at a desired working temperature.

2. The projection apparatus as claimed in claim 1, wherein the projection apparatus comprises a plurality of heat generating elements, and the liquid flow system is disposed along the plurality of heat generating elements.

3. The projection apparatus as claimed in claim 2, wherein the plurality of heat generating elements comprises a light source module.

4. The projection apparatus as claimed in claim 3, wherein the light source module is a light emitting diode (LED) module.

5. The projection apparatus as claimed in claim 4, wherein the LED module comprises a plurality of LEDs, disposed in series along the liquid flow system, whereby liquid in the liquid flow system is adapted to travel through the plurality of LEDs sequentially.

6. The projection apparatus as claimed in claim 4, wherein the LED module comprises a plurality of LEDs, disposed in parallel with one another in view of the liquid flow system, whereby liquid in the liquid flow system is adapted to travel through the plurality of LEDs simultaneously.

7. The projection apparatus as claimed in claim 3, wherein the light source module is an ellipsoid lamp module.

8. The projection apparatus as claimed in claim 1, wherein the heat generating device is a thermal electric (TE) device.

9. The projection apparatus as claimed in claim 8, wherein the thermal electric device is a TE cooler.

10. A projection apparatus, comprising:
a least one heat generating element;
a temperature controlling system, comprising:
a liquid flow system, disposed along the at least one heat generating element;
a heat generating device for generating a heat with a positive value in response to a temperature of an interior of the projector apparatus being lower than a start-up temperature; and
a heat transferring device for transferring the heat generated by the heat generating device along the liquid flow system, thereby maintaining the projection apparatus at operation at a desired working temperature.

11. The projection apparatus as claimed in claim 10, wherein the projection apparatus comprises a plurality of heat generating elements, and the liquid flow system is disposed along the plurality of heat generating elements.

12. The projection apparatus as claimed in claim 11, wherein the plurality of heat generating elements comprises a light source module.

13. The projection apparatus as claimed in claim 12, wherein the light source module is an LED module.

14. The projection apparatus as claimed in claim 13, wherein the LED module comprises a plurality of LEDs, disposed in series along the liquid flow system, whereby liquid in the liquid flow system is adapted to travel through the plurality of LEDs sequentially.

15. The projection apparatus as claimed in claim 13, wherein the LED module comprises a plurality of LEDs, disposed in parallel with one another in view of the liquid flow system, whereby liquid in the liquid flow system is adapted to travel through the plurality of LEDs simultaneously.

16. The projection apparatus as claimed in claim 12, wherein the light source module is an ellipsoid lamp module.

17. The projection apparatus as claimed in claim 10, wherein the liquid flow system is substantially connected with the at least one heat generating element.

18. The projection apparatus as claimed in claim 10, wherein the heat transferring device includes at least one fin.

19. The projection apparatus as claimed in claim 10, wherein the heat transferring device includes at least one fan.

20. The projection apparatus as claimed in claim 10, wherein the heat generating device is a TE device.

21. The projection apparatus as claimed in claim 1, wherein the low start-up temperature is 5° C. and the high start-up temperature is 35° C.

* * * * *